(12) United States Patent
McLean et al.

(10) Patent No.: US 9,876,240 B2
(45) Date of Patent: Jan. 23, 2018

(54) MULTI-FUNCTIONAL FUEL CABLE

(71) Applicant: Intelligent Energy Limited, Loughborough (GB)

(72) Inventors: Gerard F. McLean, West Vancouver (CA); Jean-Louis Iaconis, Burnaby (CA); Andrew J. Curello, Hamden, CT (US); Aaron Joseph MacDonald, North Vancouver (CA); Sven Sturm, North Vancouver (CA)

(73) Assignee: Intelligent Energy Limited, Loughborough (GB)

( * ) Notice: Subject to any disclaimer, the term of this patent is extended or adjusted under 35 U.S.C. 154(b) by 573 days.

(21) Appl. No.: 14/246,863

(22) Filed: Apr. 7, 2014

(65) Prior Publication Data

US 2015/0288010 A1  Oct. 8, 2015

(51) Int. Cl.
*H01M 8/04* (2016.01)
*H01M 8/04082* (2016.01)

(52) U.S. Cl.
CPC ... *H01M 8/04201* (2013.01); *H01M 8/04208* (2013.01); *H01M 2250/30* (2013.01); *Y02B 90/18* (2013.01); *Y02P 70/56* (2015.11)

(58) Field of Classification Search
None
See application file for complete search history.

(56) References Cited

U.S. PATENT DOCUMENTS

| 3,438,892 A | 4/1969 | Wymore et al. |
| 4,763,683 A | 8/1988 | Carmack |
| 5,976,725 A | 11/1999 | Gamo et al. |
| 6,447,945 B1 | 9/2002 | Streckert et al. |
| 7,147,004 B1 * | 12/2006 | Hartman ............... F16L 37/18 137/614.06 |
| 7,205,060 B2 | 4/2007 | Kaye et al. |
| 7,481,858 B2 | 1/2009 | Rosenzweig et al. |

(Continued)

FOREIGN PATENT DOCUMENTS

| WO | WO 2008/016721 A2 | 2/2008 |
| WO | WO 2013/107803 A1 | 7/2013 |

OTHER PUBLICATIONS

International Patent Application No. PCT/US2015/24509; Int'l Search Report and the Written Opinion; dated Aug. 19, 2015; 12 pages.

(Continued)

*Primary Examiner* — Eli Mekhlin
(74) *Attorney, Agent, or Firm* — Baker & Hostetler LLP

(57) ABSTRACT

The present invention relates to a connector or cable between the fuel supply and the fuel cell that in addition to transporting fuel and electrical power can also communicate control signals between the fuel cell and the cartridge to instruct the fuel cartridge or the fuel cell or both to commence or cease the operation of one or more functions. Control signals can be electrical, fluidic/hydraulic and/or mechanical. The connector or cable may also transport electricity produced by the fuel cell to power an electronic device, and/or to the fuel cartridge to power a component(s) on the cartridge or to re-charge a battery. The connector or cable may have universal connectors that can attach to multiple fuel cells, fuel cartridges and electronic devices, even when manufactured by different manufacturers.

11 Claims, 13 Drawing Sheets

(56) References Cited

U.S. PATENT DOCUMENTS

| | | | |
|---|---|---|---|
| 7,537,024 B2 | 5/2009 | Adams et al. | |
| 7,642,742 B2 | 1/2010 | Curello et al. | |
| 7,655,147 B2 | 2/2010 | Curello et al. | |
| 7,655,331 B2 | 2/2010 | Adams et al. | |
| 7,727,293 B2 | 6/2010 | Rosenzweig et al. | |
| 7,762,278 B2 | 7/2010 | Adams et al. | |
| 8,002,853 B2 | 8/2011 | Curello et al. | |
| 8,166,833 B2 | 5/2012 | McLean | |
| 8,196,894 B2 | 6/2012 | Spahr et al. | |
| 8,561,695 B2 | 10/2013 | Cameron et al. | |
| 8,613,297 B2 | 12/2013 | Adams et al. | |
| 8,679,694 B2 | 3/2014 | Zimmerman et al. | |
| 9,023,545 B2 | 5/2015 | Iaconis | |
| 2003/0022045 A1 | 1/2003 | Wells et al. | |
| 2004/0076783 A1 | 4/2004 | Norman et al. | |
| 2005/0162122 A1* | 7/2005 | Dunn | H01M 8/04089 320/101 |
| 2006/0257707 A1 | 11/2006 | Kaschmitter et al. | |
| 2007/0012363 A1 | 1/2007 | Inoue | |
| 2008/0145739 A1 | 6/2008 | Adams et al. | |
| 2008/0199759 A1* | 8/2008 | Adams | H01M 8/04201 429/421 |
| 2009/0117420 A1 | 5/2009 | Nakakubo | |
| 2010/0104481 A1 | 4/2010 | Curello et al. | |
| 2011/0008704 A1* | 1/2011 | Hasebe | H01M 8/04201 429/480 |
| 2011/0099904 A1 | 5/2011 | Rosenzweig et al. | |
| 2011/0104021 A1 | 5/2011 | Curello et al. | |
| 2011/0121220 A1 | 5/2011 | Curello et al. | |
| 2011/0169259 A1 | 7/2011 | Schulze | |
| 2011/0189574 A1 | 8/2011 | Curello et al. | |
| 2011/0212374 A1 | 9/2011 | Rosenzweig et al. | |
| 2011/0243836 A1 | 10/2011 | Curello et al. | |
| 2012/0264028 A1* | 10/2012 | Skala | F16K 1/222 429/444 |
| 2013/0043125 A1 | 2/2013 | Gill et al. | |
| 2014/0220468 A1* | 8/2014 | Lang | H01M 8/04029 429/436 |
| 2014/0272647 A1 | 9/2014 | Iaconis et al. | |
| 2014/0272658 A1 | 9/2014 | Curello et al. | |

OTHER PUBLICATIONS

European Patent Application No. 15776446.5; Supplemental Search Report; dated Oct. 13, 2017; 10 pages.

* cited by examiner

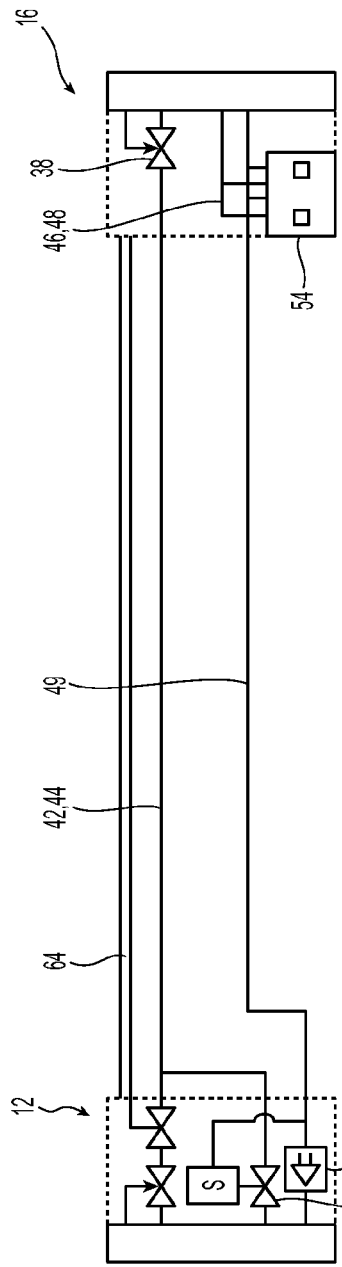
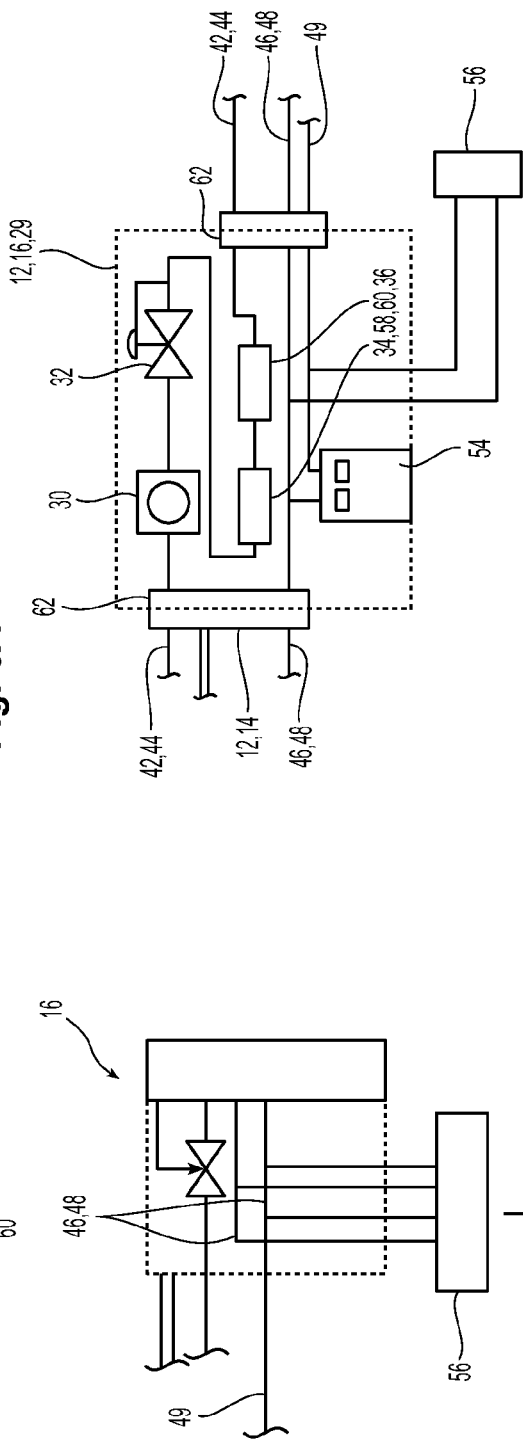
Fig. 6A
Fig. 6B
Fig. 7A

MULTI-FUNCTIONAL FUEL CABLE

FIELD OF THE INVENTION

This invention generally relates to a multi-functional cable or connector that connects a fuel cartridge to a fuel cell. More specifically, the present invention relates to a multi-functional cable or connector that in addition to transporting fuel, electrical power and/or signals can transform, modify or alter at least one property of the fuel, electrical power or signals beyond the losses due to friction in the cable or losses/attenuation due to the cable's electrical resistance or impedance.

BACKGROUND OF THE INVENTION

Some electronic devices have embedded fuel cell and embedded fuel cartridge(s); some electronic devices have embedded fuel cell and external fuel cartridge(s) that needs to be connected to the fuel cell. Modern electronic devices, such as mobile or smart phones, computer tablets, computer laptops and other consumer devices, have different electrical power demands. Fuel cells have varying electrical outputs and different demands for fuel pressure and flow rate. Fuel cartridges produce fuel cell fuels, such as hydrogen, butane and methanol, at different flow rates and pressures that may not be compatible with the fuel cells. Incorporating the fuel supply, which can be an exothermic hydrogen generator, the functional or balance of plant (BOP) components, and the fuel cell into an electronic component can cause thermal, mechanical electronic and fluidic challenges.

Embedding fuel cells within electronic devices and fueling these fuel cells with external fuel supplies are not fully developed and described in the scientific or patent literatures. Simple tubular connectors between the fuel supplies and the fuel cells are disclosed in U.S. Pat. No. 6,447,945 and US publication no. 2004/0076783. U.S. Pat. No. 8,613,297 B2 discloses the connection and disconnection at the valve interface between the fuel supplies and the fuel cell devices. However, the patent literature does not disclose safe removal of cartridges for remote locations, e.g., when the cartridges are not directly inserted to or into the fuel cell devices. The literatures also do not disclose how to handle the functional components that are necessary to the operations of the fuel cell or the fuel cartridge.

Additionally, power production from fuel cells vary depending on the type of fuel cells and the power demands by electronic devices also vary. Therefore, it is difficult to design on-board power systems that are compatible with these varieties.

Hence, there remains a need for a smart or multi-functional cable that can communicate fuel, electrical power and/or control signals among the fuel cartridge, fuel cell and/or electronic device.

SUMMARY OF THE INVENTION

The present invention relates to an interconnect cable that has valves built into either end connector or both end connectors. The valve(s) are preferably actuated when the interconnect cable is connected to its mating connectors on the fuel supply or cartridge, or on the fuel cell or electronic device.

The interconnect cable may include a transforming element disposed therewithin. The transforming element preferably alters a property of a fuel being transported from the fuel supply through the fuel transfer cable to the fuel cell or device that is beyond the losses or attenuations associated with the transportation of said fuel.

The present invention also relates to a connector or cable connecting the fuel supply and the fuel cell that in addition to transporting fuel and/or electrical power can also communicate control signals between the fuel cell and the cartridge to instruct the fuel cartridge or the fuel cell or both to commence or cease the operation of one or more functions. Control signals can be electrical, fluidic/hydraulic and/or mechanical.

The present invention also relates to a cable that may also transport electricity produced by the fuel cell to power an electronic device and/or to the fuel cartridge to power a component(s) on the cartridge or to re-charge a battery. In one embodiment, the cable has at least one universal connector that can be used to attach multiple fuel cells, fuel cartridges and electronic devices together. The insertion of the cable to the fuel supply and/or the fuel cell may also start the operation of one or both devices.

Another embodiment of the present invention relates to a fuel transfer cable that comprises a first connector adapted to connect to a fuel supply, a second connector adapted to connect to a fuel cell, an elongated tube fluidly connecting the first connector to the second connector, so that a fuel in the fuel supply is transported to the fuel cell, and at least one valve to stop the transportation of the fuel. The fuel transfer cable further comprises a transforming element disposed within the fuel transfer cable, wherein the transforming element alters a property of said fuel being transported through the fuel transfer cable that is beyond the losses or attenuation associated with the transportation of said fuel. The transforming element can be located anywhere within the cable including one of the connectors.

The transforming element can be a dryer and the dryer alters the water content of the fuel. The transforming element can be a passive pressure regulator, and the passive pressure regulator alters the pressure of the fuel. The transforming element can be a getter or filter that can remove at least one contaminant from the fuel. The fuel cell preferably comprises an anode fuel chamber and a cathode air (non-fuel) chamber, but no other fuel chamber.

Another embodiment of the present invention relates to a combination fluidic and electrical transfer cable comprising a first connector adapted to connect to a fuel supply, and a second connector adapted to connect to a fuel cell producing electricity for an electronic device. A multi-conduit elongated tube connects the first connector to the second connector so that a fuel in the fuel supply is transported from the fuel supply to the fuel cell through a first fluidic conduit in the elongated tube, and electrically connects the fuel cell to the electronic device so that the electricity produced by the fuel cell is transported to the electronic device through a second electrical conduit in the elongated tube.

Preferably, at least one of the first or second connector comprises a flow control element that closes to the flow of fuel until the connectors are fluidly connected to the fuel supply and fuel cell. The flow control element comprises a normally closed valve and during the connections to the fuel supply and the fuel cell the normally closed valve opens. The transfer cable preferably has at least one transforming element that alters at least one property of the fuel being transported through the transfer cable. The transforming element can be at least one of a dryer, a pressure regulator, a pressure relief device or a filter.

The elongated tube preferably comprises at least one fluidic conduit to transport the fuel, at least one utility conduit to transport the electrical power generated by the fuel cell and at least one signal conduit to transmit electrical signals. The fluidic and electrical transfer cable may further comprise a tamper resistant element. Optionally, one of the connectors comprises a half galvanic cell and one of the fuel supply or the fuel cell comprises a corresponding half galvanic cell, wherein when connected the two half galvanic cells form a galvanic cell.

Another embodiment of the present invention relates to a fuel transfer cable comprising a first connector adapted to connect to a fuel supply, a second connecter adapted to connect to a fuel cell, an elongated tube fluidly connecting the first connector to the second connector, so that a fuel in the fuel supply is transported to the fuel cell, and a tamper resistant element. The tamper resistant element comprises a normally closed valve kept open by an actuator, wherein when the actuator is broken or cut the second normally closed valve closes. The actuator comprises a conduit within the elongated tube that contains a pressurized hydraulic fluid. The actuator may comprise a sheath and a movable rod contained within the sheath. During connection of the second connector to the fuel cell, the rod is moved relative to the sheath to open a normally closed valve.

Yet another embodiment of the present invention is related to a dehumidification device or a dryer comprising an elongated channel sized and dimensioned for a gas stream to pass through, wherein at least one surface on the channel comprises an ion-exchange material, and wherein water from the gas stream selectively passes through the ion-exchange material and is removed from the gas stream. The elongated channel preferably comprises a tortuous path. The elongated channel can also be a spiral path defined on a body member, and the body member is covered by a membrane made from the ion-exchange material.

Another embodiment of the present invention relates method to a method for operating a fuel cell system having a fuel cell, a fuel supply and a fuel transfer cable comprising the steps of connecting the fuel transfer cable to the fuel supply and connecting the fuel transfer cable to the fuel cell to start the flow of fuel from the fuel supply to the fuel cell and to generate electricity from the fuel cell without actuating an ON/OFF button on the fuel cell system.

BRIEF DESCRIPTION OF THE DRAWINGS

In the accompanying drawings, which form a part of the specification and are to be read in conjunction therewith and in which like reference numerals are used to indicate like parts in the various views:

FIG. 6A is a schematic view of additional functional features associated with or connected to the inventive cable; FIG. 6B is a schematic view of an alternate end connector;

FIG. 7A is a schematic view of an optional hub portion of the inventive cable.

DETAILED DESCRIPTION OF THE PREFERRED EMBODIMENTS

Figure 1A:
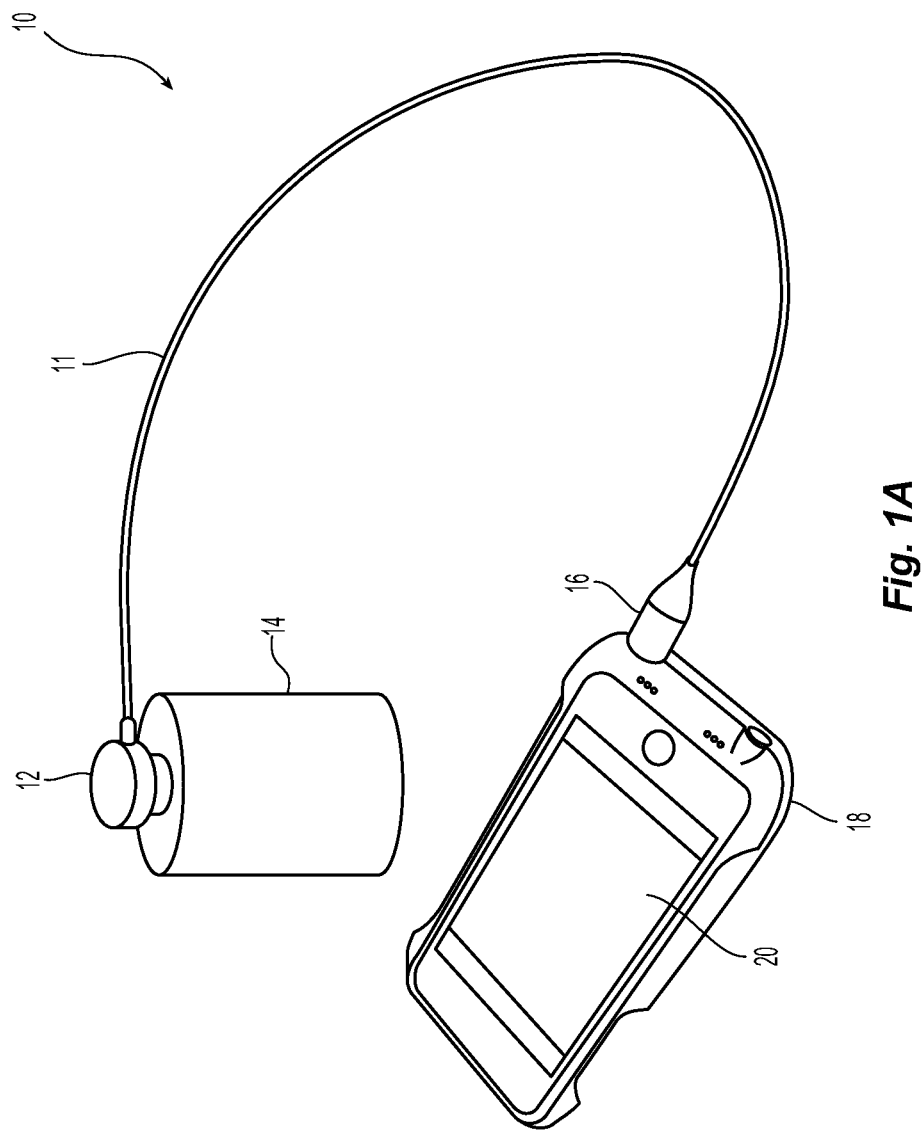
FIGS. 1A and 1B show the perspective views of the inventive multifunctional or smart cable with a fuel cartridge, various fuel cells and an electronic device.
Figure 1B:
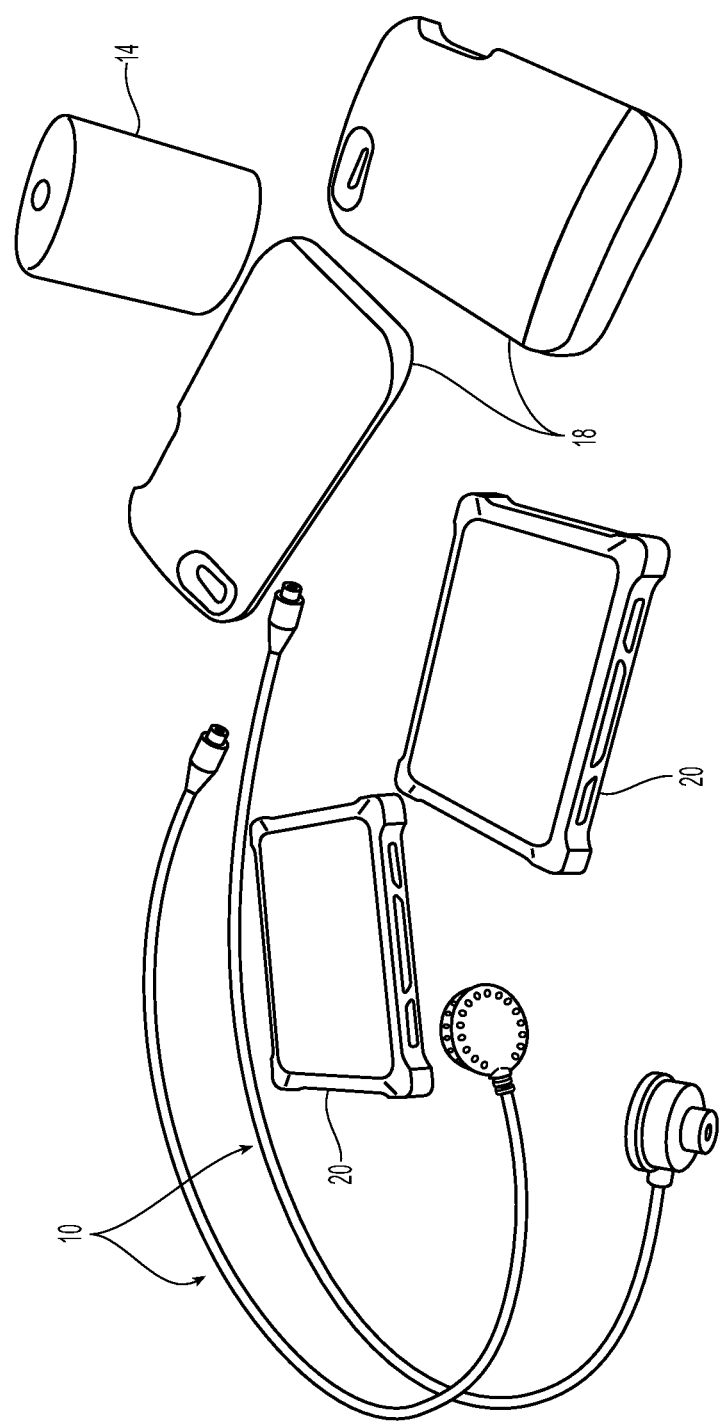

The inventive multifunctional cable 10 is illustrated in FIGS. 1A and 1B. Cable 10 has cartridge connector 12, which is sized and dimensioned to connect to the outlet of fuel cartridge 14, and fuel cell connector 16, which is sized and dimensioned to connect to the inlet of fuel cell 18. A tube 11, which may have a single conduit or multiple conduit, connects cartridge connector 12 to fuel cell connector 16. As shown in FIG. 1A, fuel cell 18 provides electrical power to electronic device 20. FIG. 1B shows the universal feature of multifunctional cable 10 that can be connected to a plurality of fuel cells 18. Although only one fuel cartridge 14 is shown, a number of different fuel supplies can be used so long as the fuel supplies have a generic or universal outlet that can connect to cartridge connector 12. In a preferred embodiment, fuel cell 18 contains an anode fuel chamber in which the fuel is supplied to the anode side of one or more individual fuel cells, and contains no other fuel chamber. It is noted that fuel cell 18 contains a cathode chamber that contains air or oxygen, which is not a fuel and is not transported by cable 10. Similarly, electronic device 20 does not contain a fuel chamber other than the anode fuel chamber when fuel cell 18 is a part of electronic device 20.

Inventive cable 10 can be configured to transport hydrogen fuel between the fuel cartridge(s) 14 and fuel cell(s) 18 and can be configured to transport electrical power or electrical signals among fuel cartridge(s) 14, fuel cell(s) 18 and/or electronic devices(s) 20, or both. While inventive cable 10 is structurally configured and is capable of transporting hydrogen fuel, electrical power and/or signals as illustrated below, in practice cable 10 can be used to transport only hydrogen, only electrical power, only signals or any combination thereof.

In a preferred embodiment, inventive cable 10 comprises a transformer that alters, modifies or transforms the property(ies) of the hydrogen fuel or other fuel cell fuels. In one example, the humidification of the fuel can be modified, transformed or altered by cable 10. In other examples, the fuel's pressure, flow rates and/or maximum flow rates are transformed, modified or altered by virtue of being transported by cable 10. These changes are above any pressure drop or reduction in velocity due to frictional loss or other naturally occurring losses associated with the transportation of the fuel through cable 10.

Figure 2:
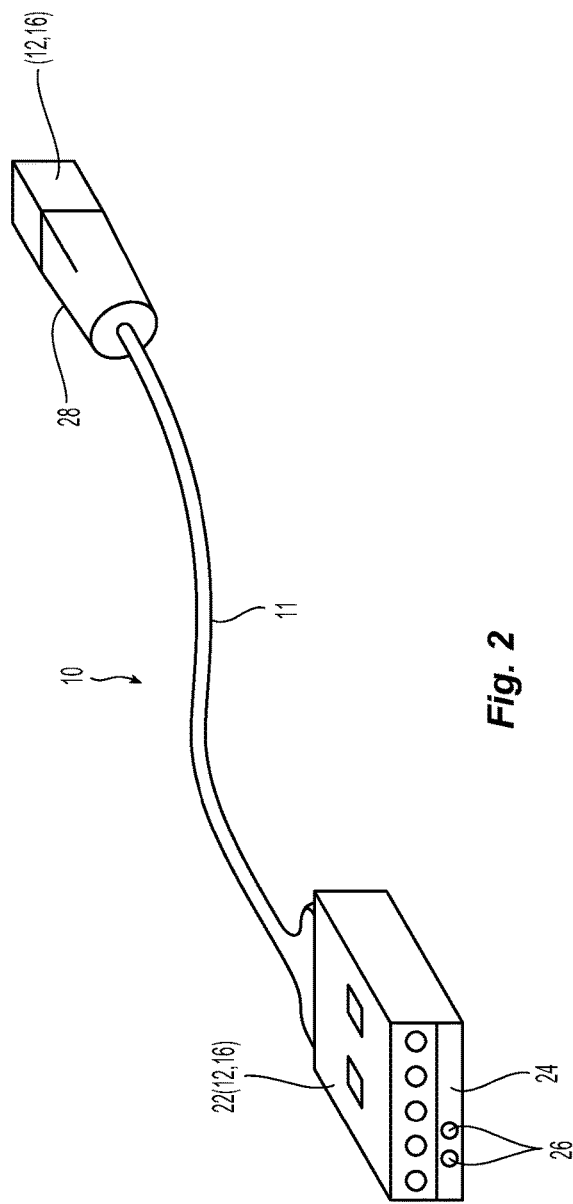
FIG. 2 is a plan view of the inventive multifunctional cable with two end connectors.

FIG. 2 shows another embodiment of multifunctional cable 10, wherein connector 22 resembles the "A" connection of a standard USB connector, except that as discussed below universal connector 22 also conducts fluidic fuel, preferably hydrogen or a liquid fuel cell fuel. In the USB, USB 2.0 and USB 3.0 cables as well as the mini/micro USB, the "A" connections are the same, and in a preferred embodiment of the present invention, one of the connectors is similar to the USB "A" connector. Either connector 12 or connector 14 can comprise the "A" type USB connector 22. The other connector may comprise the "B" type USB connector 28, which has a square shape with two beveled corners. The "A" connector has a plastic piece at its terminus to guide the orientation for insertion. In connector 22, this plastic piece 24 has one or more fluidic conduits 26 formed therein to carry fuel from fuel cartridge 14 to fuel cell 18, and member 24 remains available to assist in the orientation of the "A" connector. As constructed, the inventive multifunctional cable 10 can also be used to connect electrical devices 20 and their electronic peripheries when no fuel cell fuel is transferred, i.e., the fluidic conduits 26 would sit idle when there is no fuel to transfer. In other embodiments discussed below, due to safeguard features fluidic conduits 26 would not open unless there is a matching fluidic connection. More particularly, each connector 12, 16 preferably contains a normally closed valve that would not open until the connectors are properly connected to fuel cartridge 14 and/or fuel cell 18.

Figure 3:
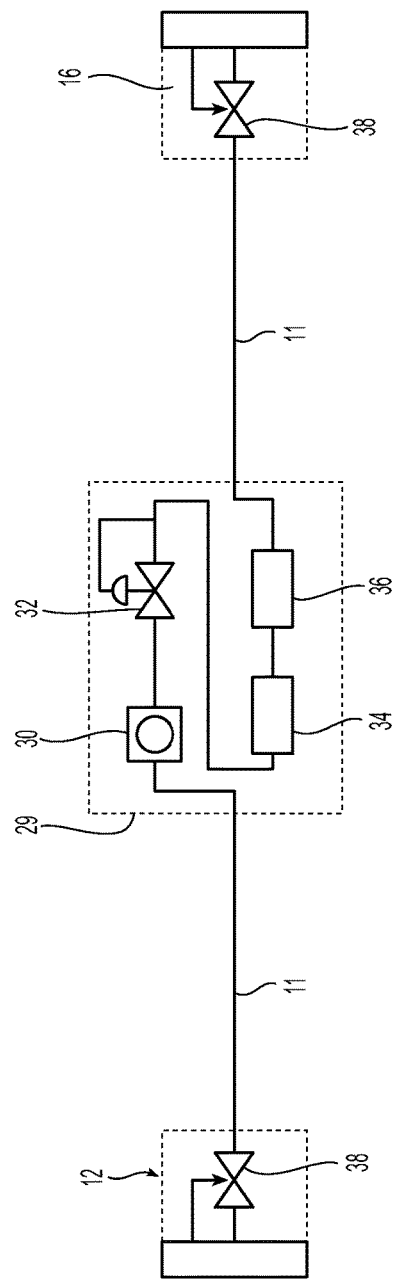
FIG. 3 is a schematic view of various functional components associated with or connected to the inventive cable.
Figure 7B:
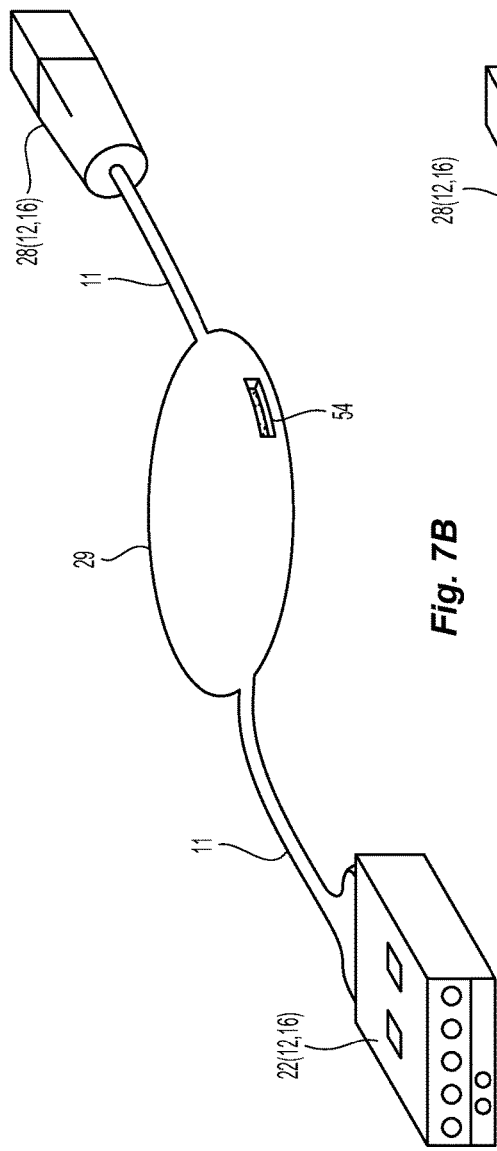
FIGS. 7B and 7C are plan views of the cable of FIG. 2 with the optional hub.

In another embodiment, cable 10 may comprise non-standard electrical connectors, e.g., non-USB cables/connectors, or other non-USB standard connectors and electrical conduit(s) with or without fluidic conduit(s). Cable 10 may provide electrical or electronic connection independent of the fluidic connection. Examples of non-USB connectors and conduit(s) include conventional serial port cables and parallel port cables with dedicated pins generally used to connect peripheral devices such as printers, monitors, keyboard, etc. to computing devices. Exemplary non-standard cables 10 are shown in FIGS. 1A-1B above and in FIGS. 12A-F below, inter alia. It is further noted that while some of the Figures shows standard USB connections, said connections can assume any non-standard shape or any non-USB standard shape, and the present invention is not limited to any standard connectors or conduits, Some of the fluidic functional elements are schematically illustrated in FIG. 3. Multifunctional cable 10 may include one or more of these fluidic functional elements. These elements can be preferably included within connector 12, connector 16, or in the conduits themselves. Alternatively, they can be included in optional hub 29. Optional hub 29 may be directly or integrally connected to cable 10 as shown in FIG. 7B, or optional hub 29 may be a stand-alone component, where multiple cables 10 are removably attached to as schematically illustrated in FIG. 7A. Preferably, the functional fluidic or electrical elements are incorporated directly to cable 10 without using hub 29. These fluidic functional elements include, but are not limited to, dryer 30 or a dehumidification device 30 to remove humidity or water vapor, pressure regulator 32, filter 34 and other fluidic functional elements 36. Other fluidic functional elements 36 may include vent(s) for purged gas pressure relief valves, any other valve(s) or pressure relief devices (PRDs). Suitable PRDs include those disclosed in U.S. Pat. No. 8,196,894, 2011/0189574, etc. These references are incorporated herein by reference in their entireties. Other fluidic functional elements 36 may include a getter to absorb impurities in the fluid(s) transported through cable 10.

Dryer 30 is designed to remove water vapor from a hydrogen flow stream. If present, preferably the section of tube 11 or connector 12/16 proximate to dryer is vented, e.g., with perforations on the sheathing of tube 11 or connector 12/16. Optionally, a heater is also provided to drive the water vapor from the dryer. Producing hydrogen using hydrolysis reactions, such as a chemical hydride fuel, e.g., sodium borohydride, potassium borohydride, ammonia borane, sodium alanate (or sodium aluminum hydride), etc., produces heat in an exothermic reaction with water. The produced heat may be transferred to dryer 30 via heat conduction through a fin or a heat conductor (not shown). Preferably, dryer 30 and/or its optional heater are located in connector 12 to be proximate to the exothermic reaction within cartridge 14. In a preferred embodiment, dryer 30 is a hollow tube or an arcuate channel at least partially constructed from a proton exchange member/membrane, such as a perfluorinated polymer available under the tradename Nafion™ or Amberlite 150™ or Amberlyst 15™ ion exchange resins. Water or water vapor is naturally attracted to such proton exchange member and is passed through the tube, and hydrogen gas on the other hand cannot pass through the proton exchange member and is conducted through the tube, as illustrated below. Dryer 30, when made from proton exchange member, does not require a heater.

Pressure regulator 32 can take a wide range of varying inlet fuel pressures and reduce the inlet pressure to a substantially constant outlet pressure suitable to the operation of fuel cell 18. Suitable pressure regulators generally include two diaphragms with a movable shuttle disposed therebetween, and are described in commonly owned Ser. Nos. 12/053,374, 13/371,089, U.S. Pat. No. 8,002,853, 2010/0104481, 2011/0189574, Ser. Nos. 13/832,528, 13/836,789 references. Preferably, pressure regulators are microfluidic regulators and are made from featured layers, such as those discussed in Ser. No. 12/053,374. These references are incorporated herein by reference in their entireties.

Filter 34 can perform a number of functions to remove various items. In one embodiment, filter 34 contains an acidic element to neutralize high pH water vapor from the hydrogen stream. A basic stabilizer, such as sodium hydroxide or potassium hydroxide, is often used to control the reaction rate between sodium borohydride and water, and the water vapor that leaves cartridge 14 may have high pH, which can be neutralized with an acidic filter. In another embodiment, filter 32 contains a proton exchange membrane/member (PEM), such as Nafion™, or Amberlite 150™ or Amberlyst 15™ ion exchange resins. Such a PEM filter can attract ions or metallic ions upstream of fuel cell 18. Ion filters are described in U.S. Pat. Nos. 7,655,331 and 7,655,147, which are incorporated by reference in their entireties.

In a preferred embodiment, at least one connector 12 or 16 comprises a shut-off valve 38 that is normally closed unless the connector is properly connected either to cartridge 14 and/or fuel cell 18. In another embodiment, each connector 12 and 16 comprises a shut-off valve 38. In one embodiment, valve 38 comprises a poppet valve, e.g., a ball valve with a ball or rigid body biased by a spring to a closed position or a valve with an elastomeric body being biased to the closed position. Another poppet valve or a tube from the fuel cartridge or the fuel cell would engage valve 38 during connection to open valve 38 while the connector 12, 16 of cable 10 is connected to fuel cartridge 14 or fuel cell 18 as discussed below in connection with FIGS. 10A-D. Other suitable shut-off valves include an elastomeric disc forming a seal against a center post passing through the hole in the disc, and a hollow tube is inserted into the shut-off valve to move the disc away from the center post to open the valve. Suitable shut-off valves 38 are disclosed in U.S. Pat. Nos. 7,537,024, 7,762,278, 2008/0145739, U.S. Pat. No. 8,561, 695, 2011/0189574, 2011/0212374, 2011/0243836, 2011/ 0099904, Ser. Nos. 13/836,789, and 13/837,410. These references are incorporated herein by reference in their entireties. In other embodiments, the shut-off function can be accomplished by other fluidic components, such as pressure regulator 32, which closes when cable 10 is not connected to fuel cartridge 14 and/or fuel cell 18.

Figure 4:
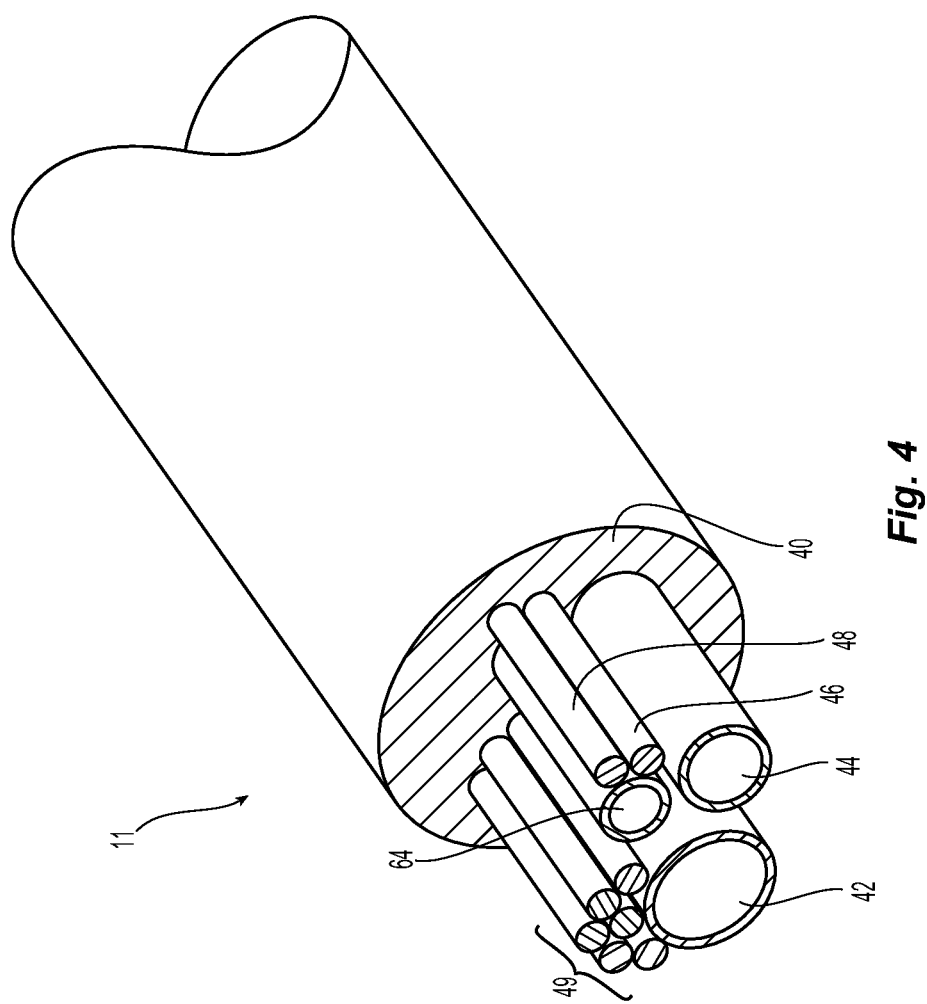
FIG. 4 is a cut-away view of the inventive cable showing the internal conduits and optional wires.

FIG. 4 illustrates the conduits within multiple conduit tube 11 between connectors 12 and 16. Tube 11 has a plurality of conduits embedded within protective sheath 40. Fuel conduit 42 is sized and dimensioned to transport fuel cell fuel, such as hydrogen or methanol among other fuels, from fuel cartridge 14 to fuel cell 18. Preferably, the length of tube 11 is limited so that the pressure drop from the fuel along conduit 42, for example, through frictional contact with the wall of conduit 42, is smaller than the pressure of the fuel at connector 12 so that fuel can effectively reach fuel cell 18. Tube 11 may have optional second fluid conduit 44. Conduit 44 may be used to transport byproduct(s) or purged gas from fuel cell 18 back to fuel cartridge 14 for storage and/or disposal. Purged gas can also be vented anywhere along tube 11 or at the connectors or hub. Second fluid conduit 44 may also carry additional fuel in the event that fuel cell 18 demands more fuel. Alternatively, second conduit 44 may also transport oxidant or air for certain fuel cell configurations.

Tube 11 also comprises utility electrical conduits 46 and 48, which may be omitted in some embodiments. Utility conduits 46 and 48 transport electrical power produced by fuel cell 18 to an electronic device, such as mobile/smart phone 20, or back to fuel cartridge 14 to power any electrical component that may be included in the fuel cartridge. For example, optional heater 11 can be powered by fuel cell 18 via electrical conduits 46 and 48. In another example, conduits 46 and 48 carry electrical power back to fuel cartridge 14 to power hydrogen generation processes that need heat, such as hydrolysis. One of the conduits 46 and 48 is preferably connected to the positive (+) terminal of fuel cell 18's conditioning circuitry or circuitry to bring the output of fuel cell 18 to an acceptable voltage and the other conduit is connected to the negative (−) terminal. In one embodiment, fuel cell 18 is embedded in the electronic device and the electrical output of fuel cell 18 is directly wired/connected to the conditioning circuitry within the electronic device, and utility conduits 46 and 48 are not needed and if present are not used.

Referring to FIG. 4, tube 11 may also have a plurality of electrical signal conduits 49. There can be any number of signal conduits 49. In one example, there are two signal conduits 49 corresponding to a USB 2.0 cable, and in another example, there are six signal conduits 49 corresponding to a USB 3.0 cable. Signal conduits 49 are designed to carry control signals to activate an electrical device, such as an electrical circuit, or an electrical-mechanical device, such as a solenoid valve. Signal conduits 49 can also carry signals from sensors in fuel cartridge 14 to fuel cell 18 and/or to electronic device 20. While not compulsory, compliance with an electrical interface standard, such as USB or Firewire, is within the scope of the present invention.

In another embodiment of the present invention, signal conduits 49 carry information relating to the state of charge of the fuel cell cartridge. The state of charge indicates the remaining amount of hydrogen that the fuel or partially spent fuel can produce through chemical reaction. For example, in a chemical hydride cartridge, such as sodium borohydride, after the hydride reacts with water to generate hydrogen gas the total volume of the remaining hydride and water and byproduct, such as sodium borate, does not decrease appreciably, such that the remaining recoverable hydrogen from continuing reaction can be reliably estimated from the total volume in certain situations. Commonly owned US 2011/0212374 to Rosenweig et al teaches that the remaining state of charge can be estimated from the electrical resistance or the density of the remaining metal hydride, water and byproduct. In one example, a voltmeter or ohmmeter can be incorporated to measure the changing resistance and the results can be carried by a signal conduit 49 to a controller or be written on a memory storage device, e.g., a EEPROM discussed below. Similarly, the state of charge or changing density can be measured, for example, by a hydrometer or a pycnometer and communicated by signal conduit 49 to a controller or a memory. US 2011/ 0212374 to Rosenweig is incorporated herein by reference in its entirety. Additionally, commonly owned U.S. Pat. No. 8,166,833 to McLean et al. also discloses a method of estimating the state of charge and is incorporated herein by reference in its entirety.

Conduit 49 can also be a hydraulic or mechanical conduit, similar to conduit 64 or 72 described below, such that a force or a pressure wave/signal can be transmitted through cable 10.

Figure 5:
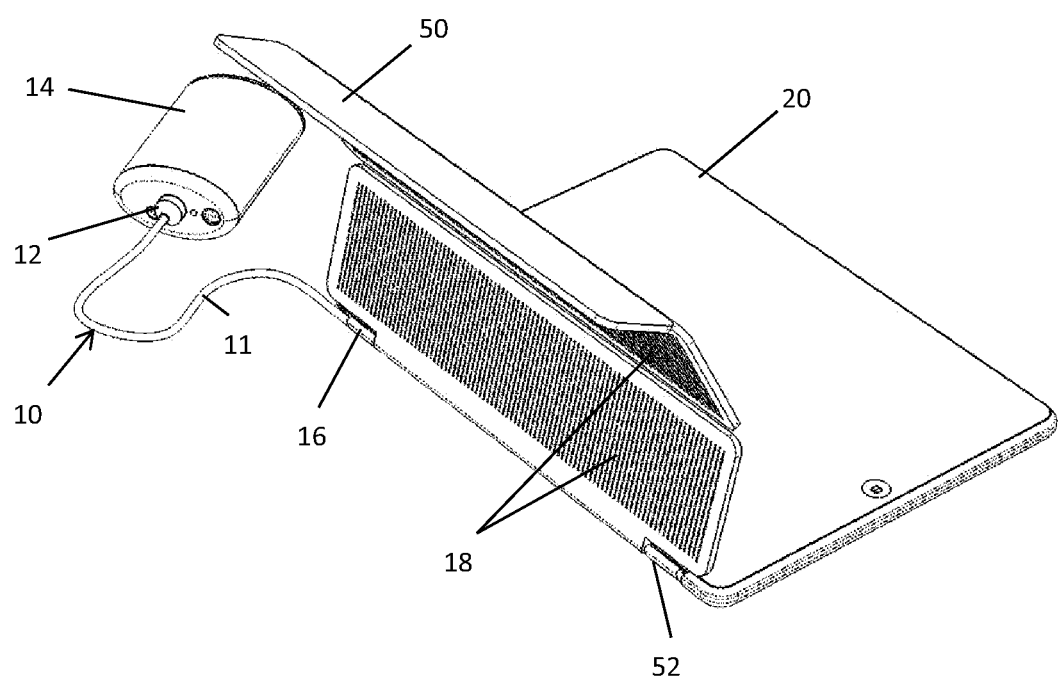
FIG. 5 is a perspective view of the inventive cable connecting a fuel cartridge to fuel cells embedded in a cover accessory to an electronic device.

In another embodiment, fuel cell 18 is embedded in an accessory of the electronic device, as illustrated in FIG. 5. As shown, fuel cells 18 are embedded in a cover 50 for an electronic device 20, such as a smart phone, a laptop computer or computer tablet 20. In this example, cover or accessory 50 with fuel cells 18 is manufactured apart from the electronic device 20, and the electrical outputs of fuel cells 18 are not directly connected to electronic device 20. In this case, the electrical output of fuel cell 18 can be connected directly to electronic device 20 through an output, such as electrical connector 52, or more preferably be directed to fuel cell connector 16 or optional hub 29 of cable 10, as illustrated in FIG. 6A. As shown, utility electrical power conduits 46 and 48 receive the electrical outputs from fuel cells 18 and are connected to a port 54 that is sized and dimensioned to receive another utility electrical power cable such as a conventional USB cable. Signal conduits 49 can also be connected to port 54. Preferably, port 54 is a universal port adapted to receive connector "A" of a USB cable, such as USB, USB 2.0, USB 3.0, mini USB, micro USB or a USB-pin connector. It is noted that the USB-pin connector typically comprises a USB connector "A" and a pin connector, which can have any number of pins and can transmit electrical power as well as electrical signals. Preferably, the pin connector can be an eight-pin connector such as the Lightning™ connector from Apple, Inc. or a thirty-pin connector also from Apple, Inc.

In another embodiment shown in FIG. 6B, instead of having port 54 connector 16 may have connector 56, which can be connector "B" of a USB, USB 2.0 USB 3.0 cable, a mini or micro USB connector, or a pin connector, discussed in the preceding paragraph. Connector 56 can be connected directly to a power charging port on electronic device 20.

Referring again to FIG. 6A, signal conduits 49 are connected to electrical or electrical-mechanical components in connector 12. For example, signal conduits 49 are connected to a solenoid valve 58, which is also connected to fuel or fluid conduit 42, 44, to open and close solenoid valve 58, which could open and close the fuel or fluid conduit. Signal conduits 49 can also be connected to electrical circuit 60, which could be designed to control and read sensors on/in the fuel cartridge, in the fuel cell or in cable 10, and transmit data collected from the sensors to fuel cell 18 or electronic device 10. Electrical circuit 60 can comprise a memory device such as an EEPROM and a processor to read and write to the memory device. Additional sensors can be deployed and connected to signal conduits 49. One exemplary sensor can be a pressure sensor located in fuel cell connector 16 to measure the pressure of the fuel, such as hydrogen, before reaching fuel cell 18. Another exemplary sensor is a fuel detection sensor such as hydrogen sensor to monitor possible leakages. Fuel cartridge sensors, smart cartridge with memory device are discussed in U.S. Pat. Nos. 7,655,331 and 7,642,742. These references are incorporated by reference herein in their entireties.

Figure 7C:
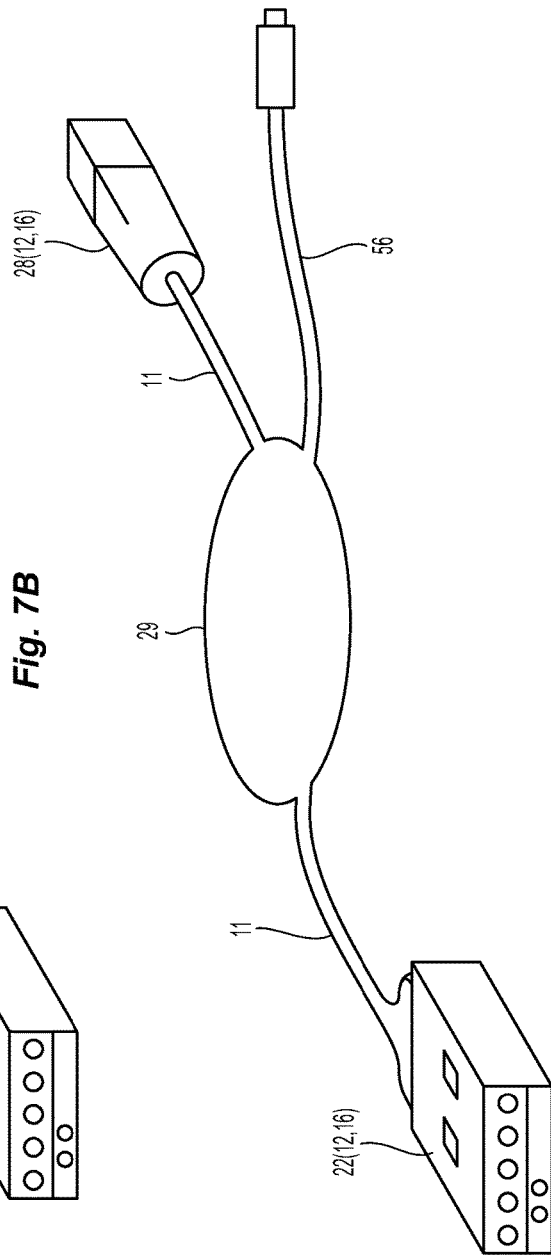

It is noted that any functional element, any combination or sub-combination or all of the functional elements discussed above can be located in cartridge connector 14, fuel cell connector 16, or in optional hub 29, as schematically illustrated in FIG. 7A. Preferably, the functional fluidic or electrical elements are incorporated directly to cable 10 without using hub 29. If hub 29 is used, it may be directly connected to connectors 12 and 16 with tubes 11, so that cable 10, hub 29 and connectors 12 and 16 form one single, non-separable unit, as shown in FIGS. 7B and 7C. Alternatively, optional hub 29 may be a separate or standalone unit with connectors 62 as best shown schematically in FIG. 7A to connect to other cables 10. Alternatively, cable 10 may have a "Y" shape similar to the embodiment of FIG. 7C, but without hub 29.

Figure 8A:
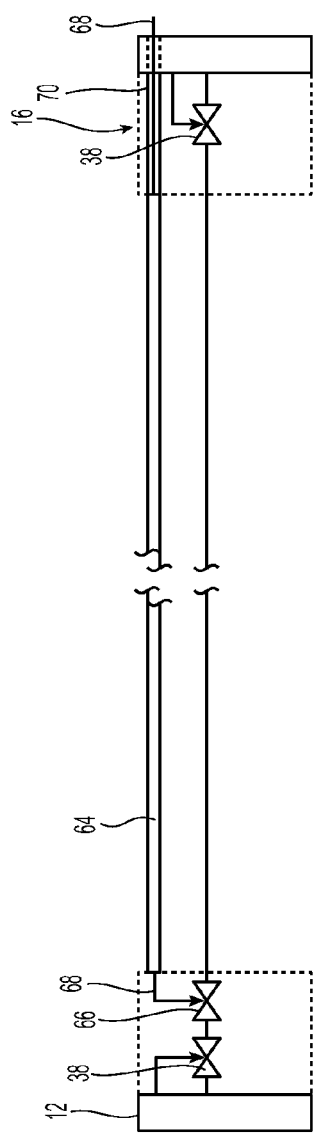
FIG. 8A is a schematic view of the inventive cable with a tamper resistance member.

Referring back to FIG. 4, cable 10 may also contain tamper resistant conduit 64. Tamper resistant conduit 64 is designed to resist the leakage of fuel in the event that cable 10 is cut. As best shown in FIG. 8A, tamper resistant conduit 64 is filled with a hydraulic fluid under pressure, preferably a slight pressure. The hydraulic pressure in conduit 64 is applied to a normally closed valve 66 located in cartridge connector 12. So long as tamper resistant conduit 64 is intact, valve 66 remains open. The pressure within conduit 64 should be sufficient to keep valve 66 open, and preferably not significantly more than this level. If conduit 64 is breached, broken or cut, then the pressure inside conduit 64 is released and the normally closed valve 66 would close thereby shutting off the flow of fuel. As shown, valve 66 is located downstream of valve 38 in the connector, so that even if valve 38 remains open due to the connection of connector 12 to fuel cartridge 14, valve 66 would stop the flow of fuel if conduit 64 is breached. The hydraulic fluid can be an inert gas, or a non-toxic liquid or oil, so that their release would not harm the fuel cell, electronic equipment, or the environment.

Alternatively, conduit 64 is the same as fuel conduit 42 that carries hydrogen and is in fluid communication with pressure regulator 32. Pressure regulator 32 can be designed or set to close when the downstream pressure is zero or substantially the same as atmosphere pressure regulator 32 closes. Hence, if tube 11 is cut then pressure regulator 32 automatically closes and shuts off the flow of fuel. Such pressure regulator is preferably a passive regulator discussed below.

In another embodiment, tamper resistant conduit 64 comprises a flexible rod 68 movable within a sheath 70, as shown in FIG. 8A. Flexible rod 68 would protrude from fuel cell connector 16, and when connector 16 is attached to fuel cell 18 this connection pushes rod 68 away. This movement would push the opposite end of rod 68 toward normally closed valve 66 to open and keep this valve open. If conduit 64 is then broken or cut, the force applied on rod 68 would vanish and normally closed valve 66 would close. Another advantage of rod 68/sheath 70 embodiment is that unless fuel cell connector 16 is connected to fuel cell 18, valve 66 remains closed and no fuel can flow. In this particular example, shut-off valve 38 may be omitted from cartridge connector 12, because valve 66 would be closed until fuel cell connector 16 is properly connected. In this example, one connection between fuel cell connector 16 and fuel cell 18 opens both connectors 12 and 16.

Figure 8B:
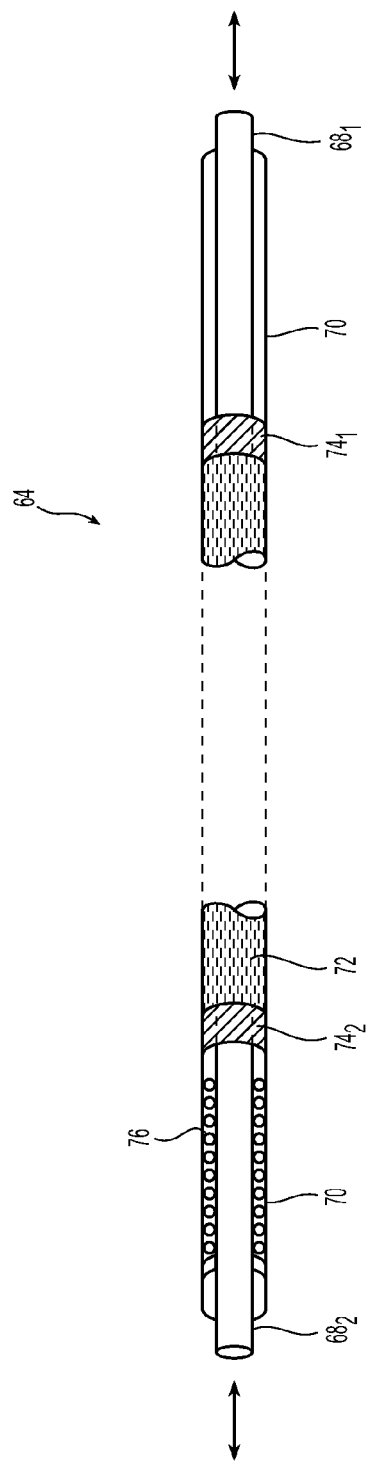
FIG. 8B shows a variation of the cable shown in FIG. 8A.

In a variation of this embodiment shown in FIG. 8B, rod 68/sheath 70 can be disposed at each end of tamper resistant conduit 64, and are hydraulically connected by a hydraulic line 72. The hydraulic line 72 would be sealed at each end with a plug or plunger 74, and rod $68_1$ on fuel cell connector 16 can push and move plunger $74_1$ and the opposite plunger $74_2$ can push and move the opposite rod $68_2$ on cartridge connector 12 to open valve 66. The force applied by the connection of the fuel cell connector 16 to fuel cell 18 pushes rod $68_1$ away and is transmitted through the hydraulic line to rod $68_2$ on the opposite end of conduit 64 to open valve 66. Preferably, a spring 76 is disposed within conduit 64 proximate cartridge connector 12 to return the plunger $74_2$ to the unconnected position when fuel cell connector 16 is disconnected from fuel cells 18, so that normally closed valve 66 may close.

In yet another variation, a shape memory allow (SMA) wire is inserted into sheath 70 or within tube 11 with both ends electrically connected to fuel cell 18 and the SMA wire is looped around or is otherwise connected at about its half of its length to normally closed valve 66. When the fuel cell is operational and produces electricity, it heats the SMA wire and shrinks the wire. This shrinkage causes the SMA wire to open normally closed valve 66 and keeps it opened. When fuel cell 18 is turned off, the SMA wire relaxes and normally closed valve 66 is allowed to close. In case sheath 70 and/or tube 11 is tampered or cut, the SMA wire is also cut and the force to keep valve 66 open is released and valve 66 closes.

In another embodiment, fuel cartridge 14 is designed to produce hydrogen fuel from a reaction between a chemical hydride, such as solid sodium borohydride or potassium borohydride, and a liquid such as water or alcohol. In this example, the two reactants are stored in separate chambers in cartridge 14, and cartridge connector 12 contains an external fluidic path to transport the liquid fuel to the solid chemical hydride fuel. Hence, unless connector 12 is properly connected to cartridge 14, the two fuels are kept apart and no hydrogen generation is possible. This embodiment is disclosed in U.S. Pat. No. 7,727,293, which discloses a receiver having fluidic conduits and valves to transport a liquid fuel out of the liquid chamber in the cartridge into the receiver and back to the reaction chamber within the cartridge to react with the chemical hydride. The '293 patent is incorporated by reference herein in its entirety.

Figure 9:
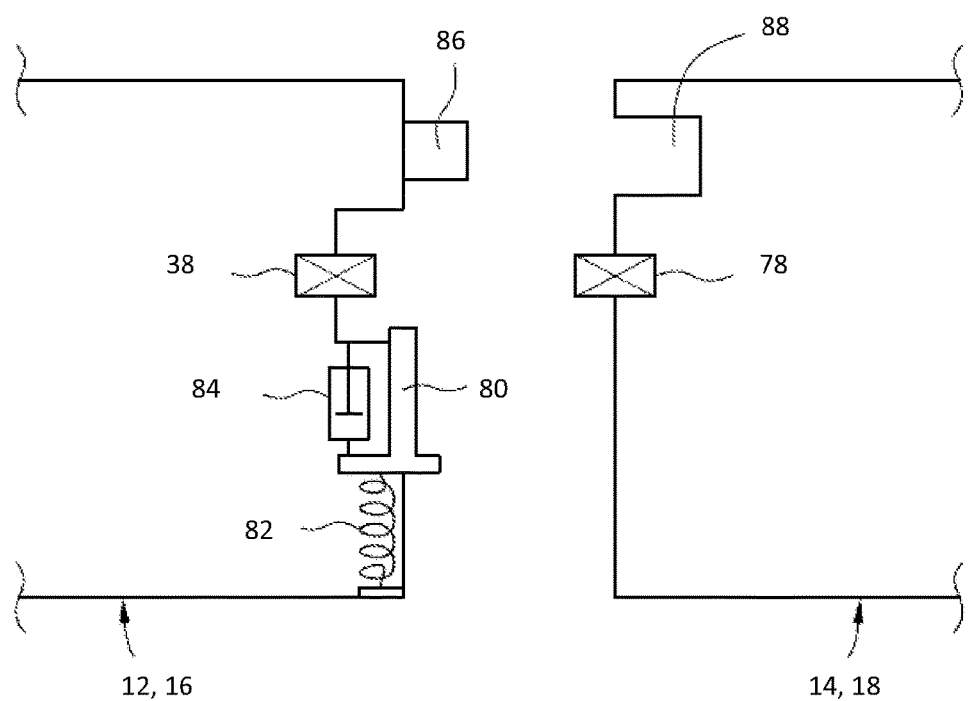
FIG. 9 is a schematic view of connectors of the inventive cable with a mechanical, electrical, magnetic or fluidic activator.
Figures 10A, 10B, 10C:
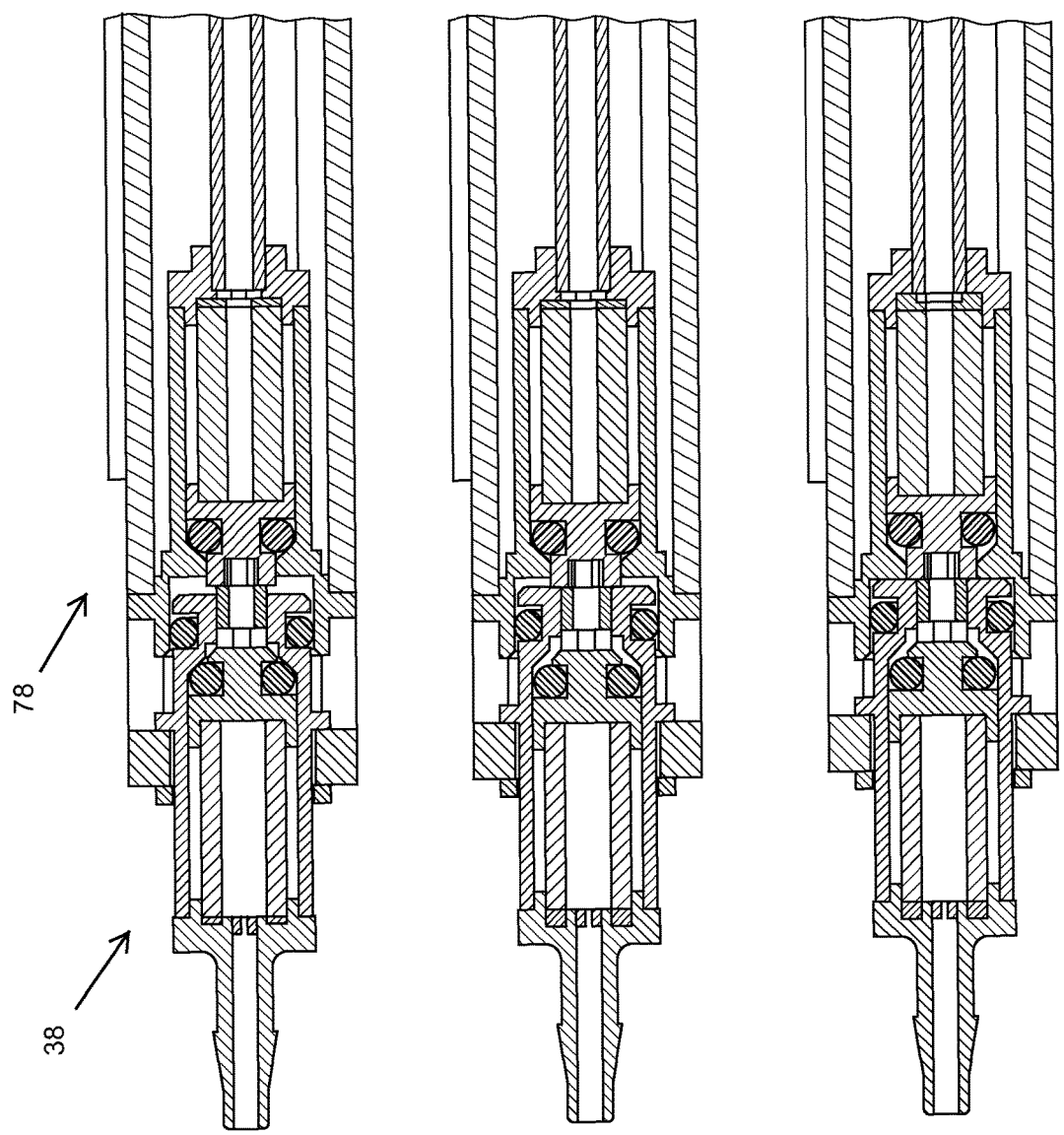
FIGS. 10A-C are cross-sectional views of a sequence of two poppet valves connecting and opening each other.
Figure 10D:
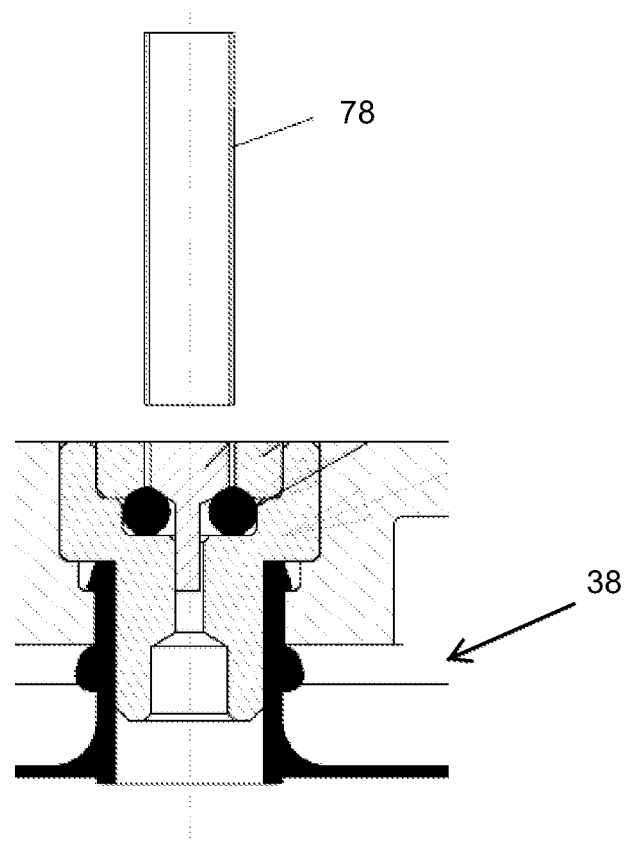
FIG. 10D is a cross-sectional view of a normally closed valve capable of being opened by a hollow tube.

Other tamper resistant features can be incorporated into cable 10. Suitable resistant features are disclosed in commonly owned U.S. Pat. No. 7,537,024, 2008/0145739, and U.S. Pat. No. 8,561,695 and these references are incorporated herein by reference in their entireties. Referring to FIG. 9 adapted from 2008/0145739, connector 12 or 16 is shown on the left with shut-off valve 38 to be matched or mated to valve 78 of fuel cartridge 14 or fuel cell 18. It is noted that valve 78 can be a simple tube that opens valve 38, which is normally closed as illustrated in FIG. 10D adapted from 2011/0121220. In one example, valve 38 is a poppet or ball valve or a valve closed by an elastomeric seal and tube 78 enters valve 38 to open same. In another example, valve 78 is another poppet valve and during connection, valve 38 and valve 78 open each other as illustrated in FIGS. 10A-C adapted from U.S. Pat. No. 7,537,024. Such valves are disclosed in U.S. Pat. Nos. 7,537,024, 7,762,278, 8,561,695.

Connector 12, 16 may also have optional gate 80 biased by spring 82 to cover valve 38. Prior to connection, a user would move gate 80 to expose valve 38 and hold gate 80 open for the connection. Alternatively, a damper 84 is provided to dampen the force exerted by spring 82 to close gate 80. This provides a short time period for the connection provided by the damper before valve 38 is covered again. It is noted that gate 80, spring 82 and damper 84 can be provided on the fuel cartridge or on the fuel cell to limit access to valve 75.

Figure 11A:
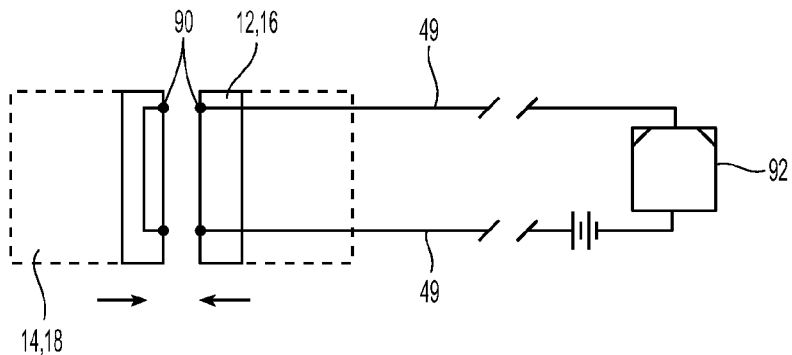
FIGS. 11A-D are schematic views of various embodiments of functional features to ensure proper connections between the inventive cable and the fuel cartridge and fuel cell.

Connector 12, 16 may also have an alignment feature such as protrusion 86, which is sized and dimensioned to be received in cavity 88. Connection of cable 10 to fuel cartridge 14 and/or fuel cell 18 can only occur when protrusion 86 aligns with cavity 88. In another embodiment, protrusion 86 and cavity 88 are replaced by a pair of electrical sensors or electrodes with one sensor/electrode on connector 12, 16 and the other on cartridge 14 or fuel cell 18. These electrical sensors/electrodes 90 are a part of an electrical circuit, and when the connections between cable 10, cartridge 14 and fuel cell 18 are properly made, the electrical sensors/electrodes 90 contact each other to complete this circuit signifying to the system's controller 92 that the proper connections were made and operation may commence, as shown in FIG. 11A. Preferably, this electrical circuit utilizes signal conduits 49 in cable 10 as part of the circuit, and the circuit is powered by a small battery or solar cell, or by a galvanic cell described below.

Figure 11B:
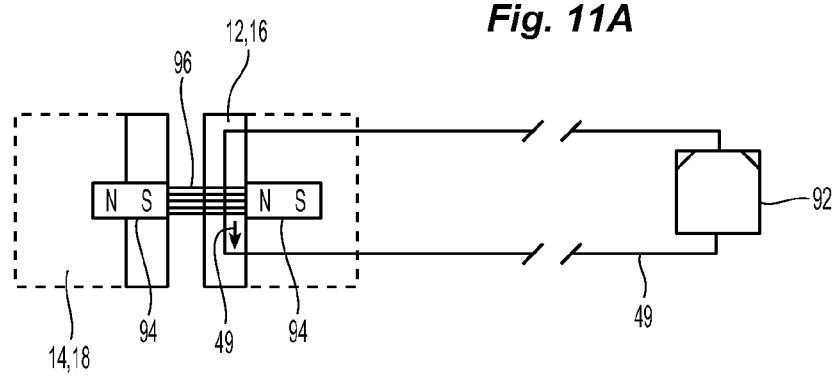
Figure 11C:
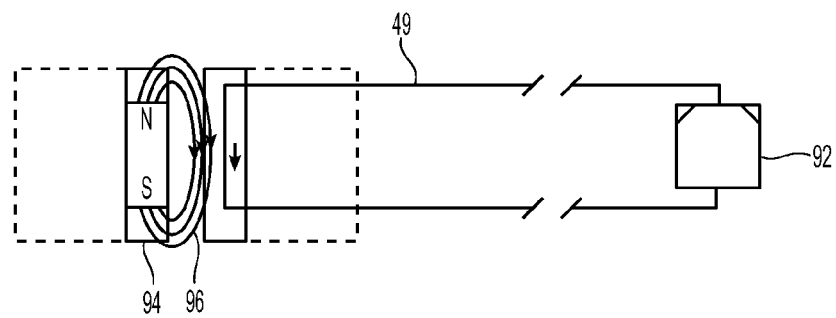

In another embodiment, a permanent magnet and metallic coil/wire are used to indicate whether the connections between cable 10, cartridge 14 and fuel cell 18 are proper. It is known that when a metallic coil or wire is exposed to a magnetic field, the magnetic field generates an electrical current in the coil or wire. As best shown in FIG. 11B, two permanent magnets 94 are provided with one in connector 12, 16 and the other in cartridge 14 or fuel cell 18. When the connectors are properly aligned and are brought close together, a magnetic field 96 is formed between opposite poles of magnets 94. If a metal wire is exposed to field 96, a current is produced in the circuit, which is detectable by controller 92 or by a voltmeter or current meter. Preferably, wire(s) 49 of tube 11 is used to construct the circuit. Alternatively, a single permanent magnet is used to generate magnetic field 96, as shown in FIG. 11C. An advantage of this embodiment is that the magnet and metal wire self-generate a signal when the connections are properly made.

Figure 11D:
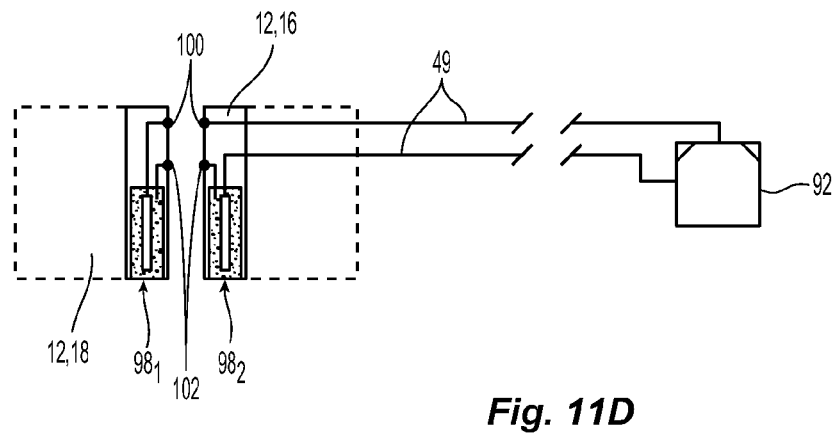

In another embodiment, a galvanic cell is used at the connections between connector 12, 16 and fuel cartridge 14 and/or fuel cell 18. Galvanic cells comprise two half-cells. Each half-cell comprises one solid metal electrode submerged in a solution containing cations of the electrode material and anions to balance the charge of the cations. The other half-cell comprises a different metal electrode. In one example, one zinc electrode is submerged in a zinc sulfate solution, and one copper electrode is submerged in a copper (II) sulfate solution. A circuit is formed when a wire connects the two electrodes and a salt bridge or porous plate connects the two solutions to conduct the ions. As shown in FIG. 11D, half-cell $98_1$ is disposed on fuel cartridge 14, fuel cell 18 or both, and half-cell $98_2$ is disposed on connector 12 or 16 or both. In one example, one half-cell comprises a zinc electrode submerged in a zinc sulfate solution and the other half-cell comprises a copper electrode submerged in a copper(II) sulfate solution. When properly connected, electrodes 100 would contact to complete an electrical circuit including the two electrodes in the two half-cells, controller 92 and signal conduits 49. Salt bridges 102 are also connected to allow ions to pass therethrough to complete the galvanic cell. Once the circuit is completed, processor 92 would be able to detect the current produced by the galvanic cell to indicate that the connections were properly made. An advantage of this embodiment is that depending on its size the galvanic cell may be able to produce sufficient electrical current to power the start-up process of the system until the fuel cell reaches a steady state of electrical production. Alternatively, the consumable components, e.g., sulfate solutions, etc., and the two half-cells can be located separate from each other on the cartridge and the non-consumable components, e.g., electrode(s) 100 and or salt bridge(s) 102 can be located on the cable 10, so that the consumables can be replaced when cartridge 14 is replaced or replenished. Controller 92 can be located in cartridge connector 12, fuel cell connector 16, hub 29, accessory 50/fuel cell 18, cartridge 14 or electronic device 20.

Additional functional elements may be necessary to control and/or regulate the fuel cell's power generation, and can be incorporated into cable 10, connector 12 and/or 16 and optional hub 29. One such element is a purging system, which may be incorporated into fuel cell connector 16 to be proximate to fuel cell 18's anode, to periodically remove gases including non-hydrogen gas from the anode side of fuel cell 18. Other functional elements include, but are not limited to, a DC-DC converter, power conditioning elements, electrical regulators and other electrical components necessary to regulate the electrical power generated by fuel cell 18 and provide regulated power to electronic device 20. Additionally, the electrical power or signals from fuel cell 18 back to cartridge 14 may be conditioned or processed by similar electrical components. Also, visual indicator(s) of the state of charge or remaining state of charge, such as LED bars, can be provided on cable 10, connector 12 and/or 16 or optional hub 29. Functional elements to control and/or regulate the fuel cell's power generation are fully described in commonly owned U.S. patent application Ser. No. 13/837,410 entitled "Methods for Operating a Fuel Cell System" filed on Mar. 15, 2013 and U.S. patent application Ser. No. 13/836,789 entitled "Fluidic Interface Module for a Fuel Cell System" filed on Mar. 15, 2013, Ser. Nos. 13/836,789 and 13/837,410. These references are incorporated by reference in their entireties.

It is preferred that at system start-up, the anodes of fuel cell 18 be purged to remove any stale gases, such as water vapor and air. Similar to the description of the purge valve system in U.S. Ser. Nos. 13/837,410 and 13/836,789, as connector 16 is connected to fuel cell 18 this motion opens the purge valve and stretches a shape memory alloy (SMA) wire without requiring the activation of an on/off switch. In one example, as hydrogen gas flows into the anode and replaces the stale gases, fuel cell 18 begins to produce electrical current, which is used to heat up the SMA wire. At a predetermined point, the SMA wire returns to its original shape and closes the purge valve. The electrical current from fuel cell 18 is then disconnected from the SMA wire. Preferably, second fluid conduit 44 is used as part of the purge system. Purged gas may be transported to cartridge 14 and vent, or it may be vented at fuel cell connector 16, optional hub 29 or cartridge connector 12. Purged gas may also be vented along tube 11.

An advantage of having functional elements, including fluidic functional elements and electronic control elements, located in fuel cell connector 16, optional hub 29 or cartridge connector 12, is that this simplifies the incorporation of a fuel cell into electronic device 20 or into accessory 50, such as a tablet cover. Space inside a computer device is limited and is even more limited within an accessory. Having the functional elements external to these devices minimizes the size and complexities of embedding or incorporating fuel cells.

Figure 12A:
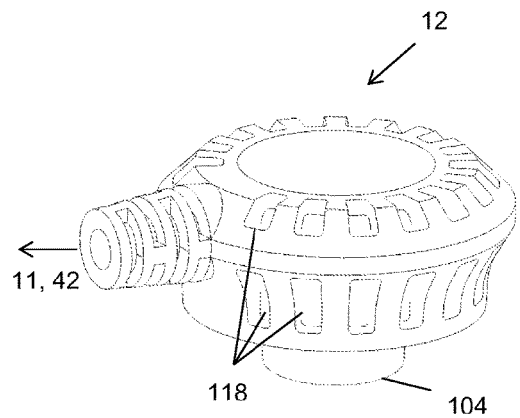
FIGS. 12A-B are respectively a perspective view and a perspective cross-sectional view of an exemplary cartridge connector.
Figure 12B:
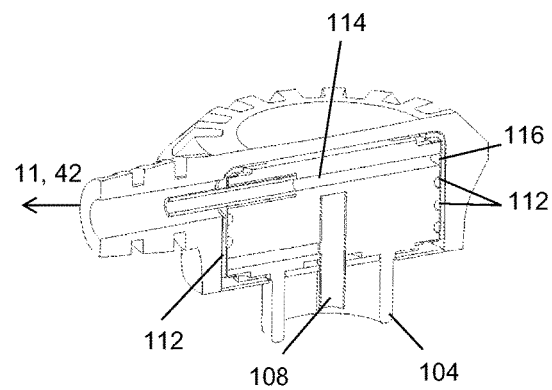

FIGS. 12A-F illustrate another embodiment of hydrogen cable 10, which in this variation transports mostly hydrogen. Cartridge connector 12, shown in FIGS. 12A-B, has connection 104 to connect to fuel cartridge 14. Connection 104 is sized and dimensioned to be received in a surface channel on fuel cartridge 14 and a hollow tube 108 is sized and dimensioned to open a shut-off valve on the fuel cartridge. Connection 104 and hollow tube 108 as well as the shut-off valve are disclosed in U.S. Pat. No. 8,561,695, 2011/0189574, 2011/0212374, 2011/0099904, 2011/0104021, Ser. Nos. 13/836,789, and 13/837,410, which are incorporated by reference herein in their entireties. Hydrogen from cartridge 14 would flow through hollow tube 108 into cartridge connector 12. From there, hydrogen would flow through internal channel 110 into dryer 30, which comprises a tortuous or arcuate path 112, which preferably is a helical path. The arcuate path provides more space or distance for the hydrogen gas to be dried of water or water vapor. The path 112 begins at its intersection with channel 110 and spirals upward around connector 12 until it intersects outlet channel 114. Hydrogen exits connector 12, and enters conduit 11 or more specifically fuel conduit 42. Dryer 30 further comprises a proton exchange membrane or ion exchange membrane (PEM) 116 wrapped around arcuate path 112. Water or water vapor has a tendency to pass through PEM 116, which preferably comprises a polymer. It has been observed that in a PEM fuel cell water vapor passes through the PEM, which may be caused by the osmotic effect. This effect is employed in the present invention to dehydrate the hydrogen gas. Preferably, PEM 116 comprises a screen or other support member to help maintain its structural integrity. As best shown in FIG. 12A, cartridge connector 12 has vents 118 to allow the water vapor removed by dryer 30 to vent to atmosphere.

Alternatively, tortuous path 112 may comprise a baffled path or a path including a plurality of baffles, shown in FIG. 11 of U.S. Pat. No. 7,481,858 and described therein. The '858 patent is incorporated herein by reference in its entirety.

Figure 12C:
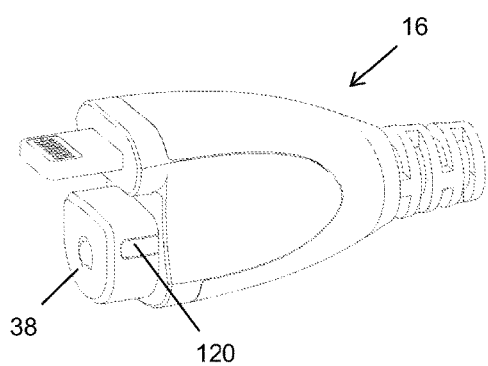
FIG. 12C is a perspective view of an exemplary fuel cell connector and FIGS. 12D-F are perspective cross-sectional views of the exemplary fuel cell connector shown in FIG. 12C.
Figure 12D:
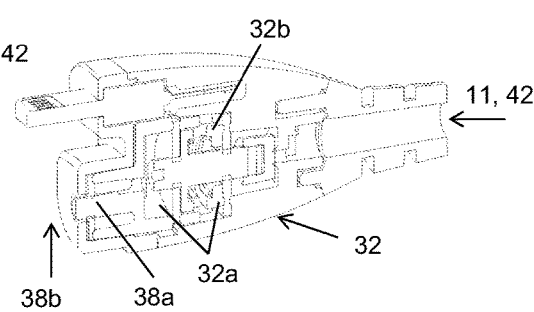

FIGS. 12C-D illustrate an exemplary fuel cell connector 16, which is fluidically and/or electrically connected to tube 11. Fuel cell connector 16 comprises shut-off valve 38 at its terminal end. Valve 38 generally comprises center post 38a and sealing member 38b, discussed above. Sealing member 38b provides a seal on an outer surface of post 38a. A hollow tube generally from the fuel cell device is inserted into valve 38 around post 38a pushing seal 38b away from post 38a to open valve 38. Preferably, fuel cell connector 16 further comprises pressure regulator 32, as discussed above. As shown, pressure regulator comprises two flexible membranes 32a and a movable body 32b disposed therebetween.

Preferably, body 32b comprises two pieces separated by a spring, as shown. Using the biasing force of the spring, the relative surface areas of the two membranes and the reference pressure, among other things, pressure regulator 32 regulates hydrogen gas at the higher pressure from conduit 42/11 and exits the gas at a lower, substantially constant pressure through the shut-off valve 38 to the fuel cell. The pressure regulator shown in FIG. 12D is substantially similar to that disclosed in commonly owned Ser. Nos. 13/836,789 and 13/837,410. Other suitable pressure regulators are described in the Ser. Nos. 12/053,374, 13/371,089, U.S. Pat. No. 8,002,853, 2010/0104481, 2011/0189574, and Ser. No. 13/832,528. All these references are incorporated herein by reference in their entireties.

It noted that pressure regulator 32 and/or dryer 30 can be located at either connector 12 or 16 and can be located within conduit 11. Additionally, the pressure regulator preferably does not need to be controlled by a processor or a computer, and the pressure regulator automatically regulates pressure. Such pressure regulators are known in the art as passive pressure regulators.

Figure 12E:
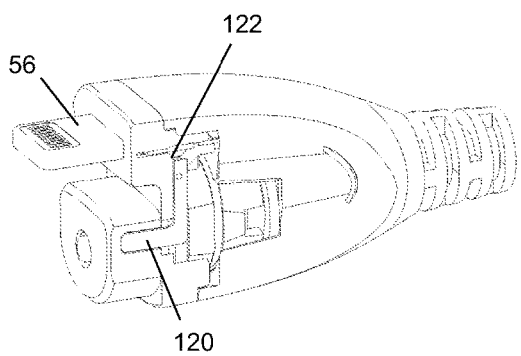
Figure 12F:
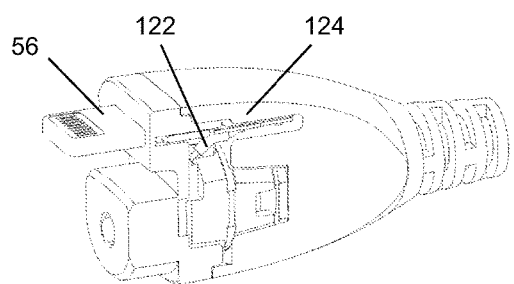

Referring to FIG. 1A, regulated hydrogen leaves fuel cell connector and is received by a fuel cell 18. The electrical output from the fuel cell is processed, for example, by a DC/DC converter to reach the desired voltage and current necessary to power electronic device 20. In one embodiment, the processed electrical output is transported back to fuel cell connector 16 via electrical contact 120, which as shown in FIG. 12C is disposed on the outer surface of valve 38. However, electrical contact 120 can be located anywhere on fuel cell connector 16. Electrical contact 120, which has an exemplary L-shape as shown in FIG. 12E, extends inside of fuel cell connector 16. Within connector 16, electrical contact 120 further electrically contacts optional contact(s) 122 and optional electrical pad 124. The processed electrical output from fuel cell 18 is eventually transported to electrical connector, similar to connector 54, 56 described above, which can be directly connected to a power charging port on electronic device 20. Non-limiting examples of this electrical connector may be a USB mini or micro connector, a Lighting™ connector, etc.

The inventive cable can also serve as a way to decouple the mechanical issues related to the fuel supply or source being damaged during operation due to impacts. Such situations disclosed in U.S. publication no. 2008/0199759.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A fuel transfer cable comprising:
   a first connector adapted to connect to a fuel supply,
   a second connecter adapted to connect to a fuel cell,
   an elongated tube fluidly connecting the first connector to the second connector, so that a fuel in the fuel supply is transported to the fuel cell, and
   a tamper resistant element having;
      an actuator; and
      a valve having an actuated open configuration and a normally closed configuration;
      wherein the valve is maintained in the actuated open configuration by the actuator such that when the actuator is broken or cut, the valve transitions to its normally closed configuration;
wherein the actuator comprises:
a sheath within the elongated tube and a flexible rod disposed movably within the sheath with a first end located at the first connector and a second end located at the second connector, wherein the second end of the flexible rod is configured to protrude from the second connector when the second connector is not connected to the fuel cell, and wherein the second end of the flexible rod is configured to he pushed during connection of the second connector to the fuel cell such that the first end of the flexible rod places the valve into the actuated open configuration, wherein the first end and the second end are hydraulically connected by a hydraulic line sealed at each end with a plug or plunger, with the actuator further comprising a spring disposed adjacent to the first end and configured to return the hydraulic line to a position in which the second end protrudes from the second connector when the second connector is disconnected from the fuel.

2. The fuel transfer cable of claim 1 further comprising a transforming element disposed within the fuel transfer cable, wherein the transforming element substantially alters a property of the fuel being transported through the fuel transfer cable that is beyond the losses or attenuation associated with the transportation of said fuel.

3. The fuel transfer cable of claim 2, wherein the transforming element comprises a dryer and the dryer alters the water content of the fuel.

4. The fuel transfer cable of claim 3, wherein the dryer comprises a proton exchange membrane or an ion exchange resin.

5. The fuel transfer cable of claim 3, wherein the dryer is located within one of the connectors.

6. The fuel transfer cable of claim 2, wherein the transforming element comprises a pressure regulator, and the pressure regulator alters the pressure of the fuel.

7. The fuel transfer cable of claim 6, wherein the pressure regulator is a passive pressure regulator and is located within one of the connectors.

8. The fuel transfer cable of claim 2, wherein the transforming element comprises a getter or a filter and the getter or filter removes at least one contaminant from the fuel.

9. The fuel transfer cable of claim 8, wherein the getter or filter is located within one of the connectors.

10. The fuel transfer cable of claim 1, wherein at least one of the first or second connector comprises a flow control element that closes to the flow of fuel until the connectors are fluidly connected to the fuel supply and fuel cell.

11. The fuel transfer cable of claim 10, wherein the flow control element comprises a valve having an open configuration and a closed configuration, and wherein during the connections to the fuel supply and the fuel cell, the valve is in the open configuration.

* * * * *